United States Patent
McAlpine et al.

(10) Patent No.: US 6,957,000 B2
(45) Date of Patent: Oct. 18, 2005

(54) PEELABLE BUFFER LAYER HAVING A PREFERENTIAL TEAR PORTION AND METHODS OF MANUFACTURING THE SAME

(75) Inventors: Warren W. McAlpine, Hickory, NC (US); Jennifer L Cline, Granite Falls, NC (US); Matthew J. Grulick, Hickory, NC (US); Taw D. North, Valdese, NC (US)

(73) Assignee: Corning Cable Systems LLC, Hickory, NC (US)

( * ) Notice: Subject to any disclaimer, the term of this patent is extended or adjusted under 35 U.S.C. 154(b) by 181 days.

(21) Appl. No.: 10/284,885

(22) Filed: Oct. 31, 2002

(65) Prior Publication Data

US 2004/0086242 A1 May 6, 2004

(51) Int. Cl.[7] ................................................. G02B 6/44
(52) U.S. Cl. ..................................... 385/102; 385/114
(58) Field of Search .............................. 385/100, 102, 385/105, 106, 114, 126–128

(56) References Cited

U.S. PATENT DOCUMENTS

| | | | |
|---|---|---|---|
| 4,072,400 A | 2/1978 | Claypoole et al. | 350/96.3 |
| 4,456,331 A | 6/1984 | Whitehead et al. | 350/96.23 |
| 4,577,925 A | 3/1986 | Winter et al. | 350/96.23 |
| 4,642,480 A | 2/1987 | Hughes et al. | 307/147 |
| 4,877,301 A | 10/1989 | Yokomori et al. | 350/96.19 |
| 4,893,893 A | 1/1990 | Claxton et al. | 350/96.23 |
| 5,011,260 A | 4/1991 | Marx et al. | 350/96.23 |
| 5,067,830 A | 11/1991 | McAlpine et al. | 385/114 |
| 5,138,684 A | 8/1992 | Bullock et al. | 385/113 |
| 5,181,268 A | 1/1993 | Chien | 385/128 |
| 5,408,564 A | 4/1995 | Mills | 385/128 |
| 5,970,196 A | 10/1999 | Greveling et al. | 385/114 |
| 5,987,204 A | 11/1999 | Lee et al. | 385/100 |
| 6,148,130 A | 11/2000 | Lee et al. | 385/100 |
| 6,404,962 B1 | 6/2002 | Hardwick, III et al. | 385/114 |
| 2002/0076179 A1 | 6/2002 | Hardwick, III et al. | 385/114 |

FOREIGN PATENT DOCUMENTS

JP 2002-214493 7/2002

OTHER PUBLICATIONS

Gary Corp., Technical Data for "Insulating Compound", Feb. 10, 1987.

*Primary Examiner*—Javaid H. Nasri
(74) *Attorney, Agent, or Firm*—Michael E. Carroll, Jr.

(57) ABSTRACT

A tight buffered optical fiber and methods of manufacturing the same include an optical fiber and a tight buffer layer. The tight buffer layer has a predetermined wall thickness generally surrounding the optical fiber and at least one preferential tear portion generally formed along a longitudinal axis of the tight buffer layer. In one embodiment, the tight buffered optical fiber has a delta attenuation of about 0.300 dB/km or less at a temperature of about −40° C. at a reference wavelength of about 1550 nm, thereby making the tight buffered optical fiber suitable for outdoor environments. Other embodiments can include a buffer layer surrounding one or more optical fiber ribbons. In other embodiments, the buffer layer can be formed from a material having an elongation to break ratio of about 500% or less.

62 Claims, 5 Drawing Sheets

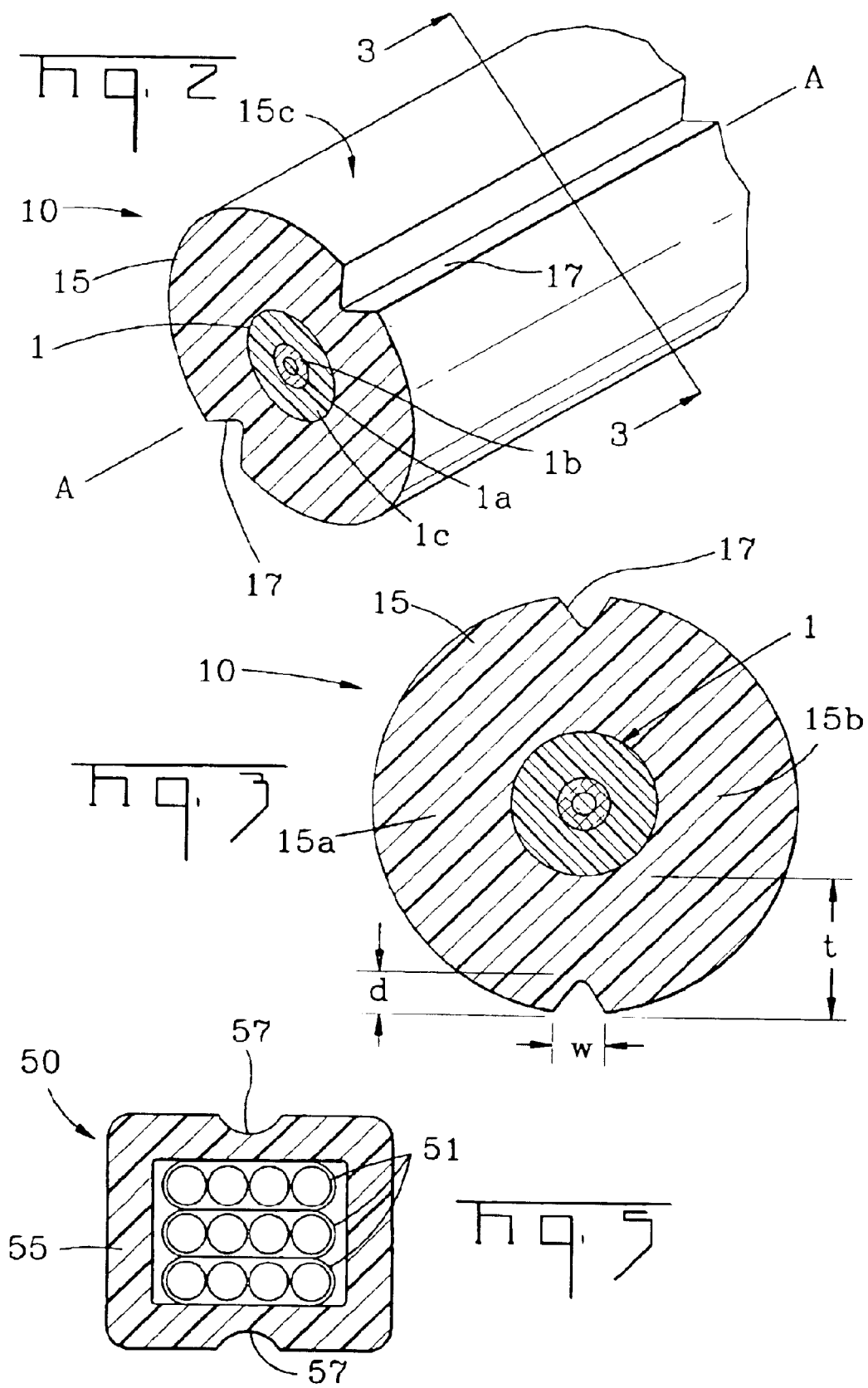

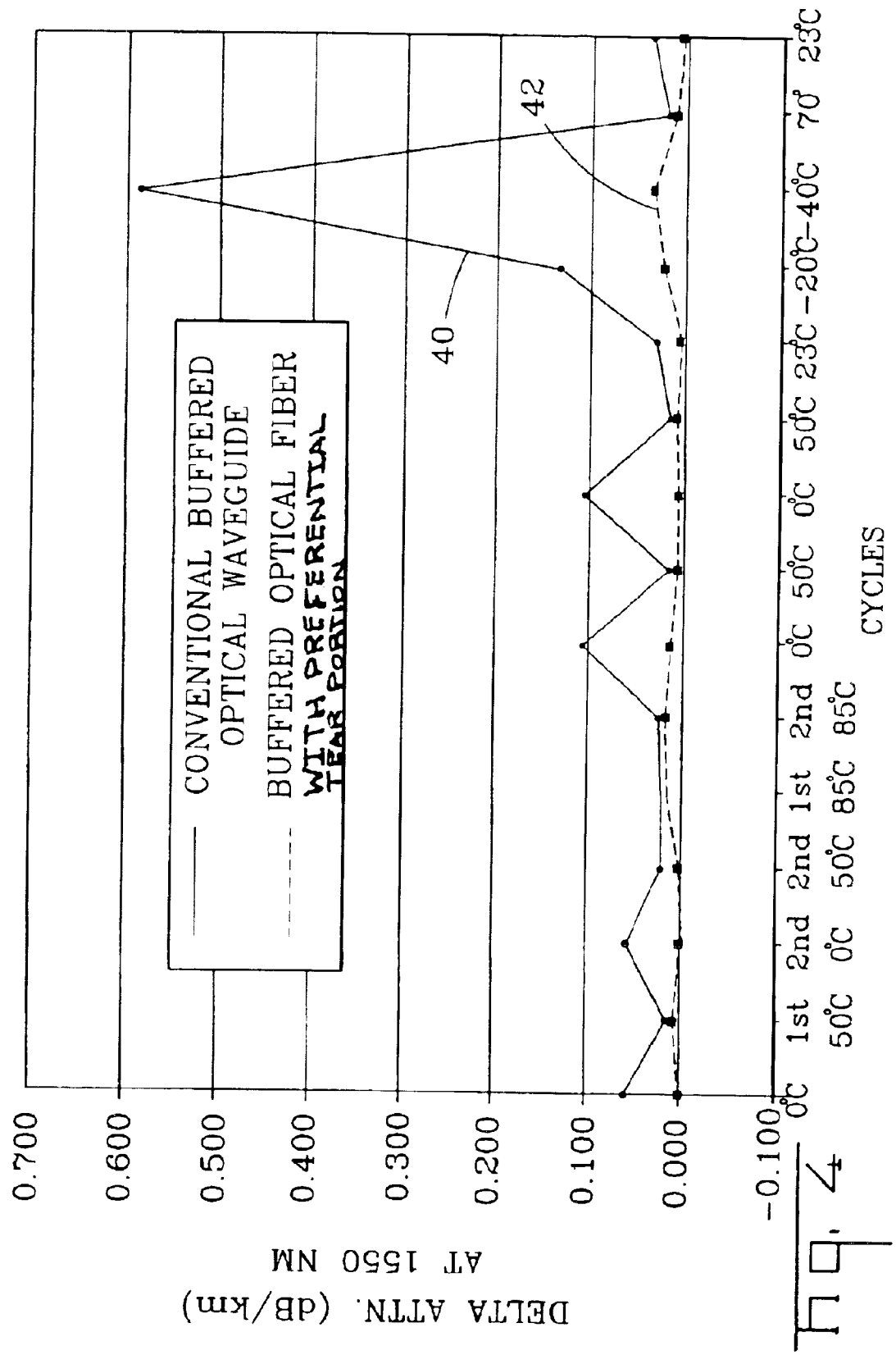

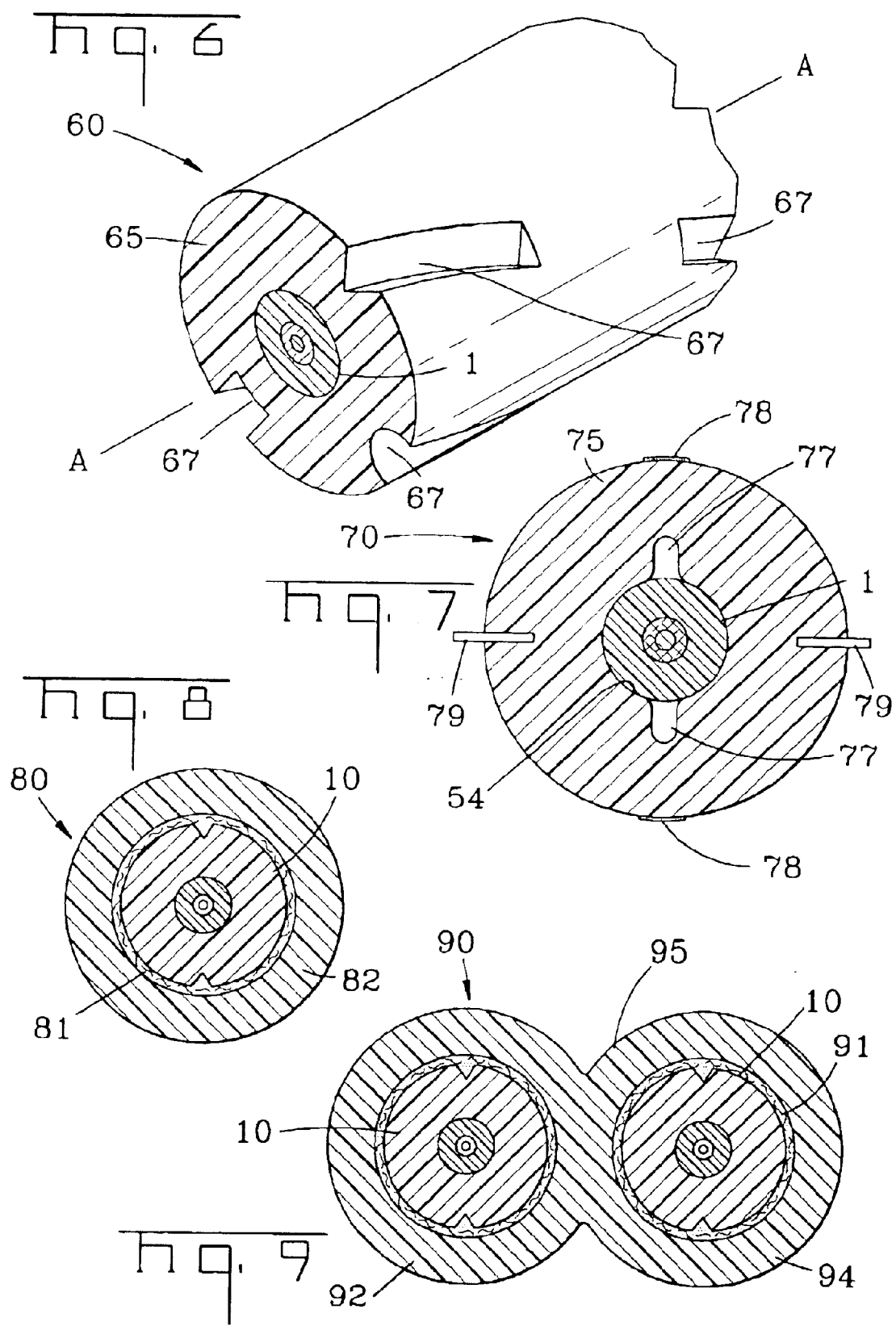

PEELABLE BUFFER LAYER HAVING A PREFERENTIAL TEAR PORTION AND METHODS OF MANUFACTURING THE SAME

FIELD OF THE INVENTION

The present invention relates generally to optical waveguide cables. More specifically, the invention relates to optical waveguide cables having a peelable buffer layer with a preferential tear portion and methods of manufacturing the same.

BACKGROUND OF THE INVENTION

FIG. 1 depicts a conventional buffered optical waveguide 7. Conventional buffered optical waveguide 7 includes an optical fiber 1 and a buffer layer 5. Optical fiber 1 generally includes a core 1a, a cladding 1b, and a coating 1c. Core 1a has an index of refraction that is greater than that of cladding 1b, thereby promoting internal reflection for transmitting optical signals. At the time of manufacture, cladding 1b is typically coated with one or more layers of coating 1c such as a UV-curable acrylate polymer. Typical outer diameters for these components are about 10 microns for a single mode core (or 50–62.5 microns for a multimode core), 125 microns for the cladding, and 250 microns for the coating, but other dimensions can be employed. Advantageously, optical fibers are capable of transmitting optical signals with relatively low optical attenuation. Nonetheless, due to their relatively sensitive nature, optical fibers can experience relatively high increases in optical attenuation when subjected to tensile, bending, or torsional stresses and/or strains.

Consequently, optical fibers can include buffer layer 5 therearound, thereby protecting the optical fiber from stresses and/or strains. Buffer layer 5 typically has an outer diameter of about 900 microns to protect the optical fiber; however, other suitable dimensions can be employed. Buffer layer 5 is generally extruded over optical fiber 1 in a relatively hot liquid form and quenched in a water trough. Moreover, buffer layer 5 can be either tight or loose depending on the degree of coupling between optical fiber 1 and buffer layer 5. However, in either instance buffer layer 5 requires stripping from the optical fiber before an optical connection to the optical fiber can be made. End users have generic requirements for the stripability of buffer layer 5 from optical fiber 1 so that optical connections can easily be performed. For example, the GR-409 standard requires a minimum, and a maximum, force to strip a predetermined length such as 15 mm of buffer layer 5 from optical fiber 1. To meet these requirements, some buffered optical fibers use a lubricant 3 that acts as a slip layer between the coating and buffer layer 5, thereby aiding stripability. However, providing lubricant increases manufacturing complexity and increases manufacturing costs. Moreover, there are applications that desire stripping long lengths such as 50 cm or more of buffer layer 5 from optical fiber 1. In order to avoid damage to optical fiber 1, stripping long lengths of buffer layer 5 is typically accomplished by stripping several shorter lengths of buffer layer 5 until the desired length of buffer layer 5 is stripped from optical fiber 1. Stripping several shorter lengths is a laborious and time-consuming process.

Additionally, due to environmental performance issues conventional buffered optical waveguides are typically only suitable for use indoors. This is because relatively low temperatures cause buffer layer 5 to shrink at a substantially different rate than optical fiber 1, thereby imparting stresses and/or strains to optical fiber 1 that degrade optical performance.

SUMMARY OF THE INVENTION

The present invention is directed to a tight buffered optical fiber that includes an optical fiber and a tight buffer layer. The tight buffer layer has a predetermined wall thickness generally surrounding the optical fiber and at least one preferential tear portion generally formed along a longitudinal axis of the tight buffer layer.

The present invention is also directed to an optical waveguide cable that includes at least one optical waveguide and a buffer layer. The buffer layer surrounds the at least one optical waveguide and includes at least one preferential tear portion. The buffer layer is formed from a material having an elongation to break ratio of about 500% or less so that the at least one preferential tear portion of the buffer layer is capable of being torn when a predetermined tearing force is applied.

Additionally, the present invention is directed to a tight buffered optical fiber consisting of an optical fiber and a tight buffer layer. The optical fiber includes a core, a cladding, and at least one coating. The tight buffer layer has at least one preferential tear portion generally formed along a longitudinal axis of the tight buffer layer. The tight buffer layer being in at least partial contact with the at least one coating of the optical fiber. Moreover, the tight buffer layer is formed from a material having an elongation to break ratio of about 300% or less so that the at least one preferential tear portion of the buffer layer is capable of being torn when a predetermined tearing force is applied.

The present invention is further directed to an optical waveguide cable that has at least one optical waveguide and a buffer layer. The buffer layer generally surrounds the at least one optical waveguide and has at least one preferential tear portion generally formed along a longitudinal axis of the buffer layer. The at least one optical waveguide has a delta attenuation of about 0.300 dB/km or less at a temperature of about −40° C.

The present invention is also directed to a method for manufacturing a buffered optical fiber. The method includes the steps of paying off an optical waveguide, and extruding a buffer layer around the optical fiber. The buffer layer having at least one preferential tear portion therein.

BRIEF DESCRIPTION OF THE FIGS.

FIG. 2 is a perspective view of a tight buffered optical fiber according to the present invention.

FIG. 3 is a cross-sectional view of the tight buffered optical fiber of FIG. 2 taken along line 3—3.

FIG. 4 is an exemplary graph depicting the delta attenuation during temperature cycling of the prior art buffered optical waveguide of FIG. 1 and the tight buffered optical fiber of FIG. 2.

FIG. 5 is a cross-sectional view of an optical waveguide cable according to another embodiment of the present invention.

FIG. 6 is a perspective view of another embodiment according to the present invention.

FIG. 7 is a cross-sectional view of another embodiment according to the present invention.

FIG. 8 is a cross-sectional view of another embodiment according to the present invention.

FIG. 9 is a cross-sectional view of another embodiment according to the present invention.

DETAILED DESCRIPTION OF THE INVENTION

Figure 1:
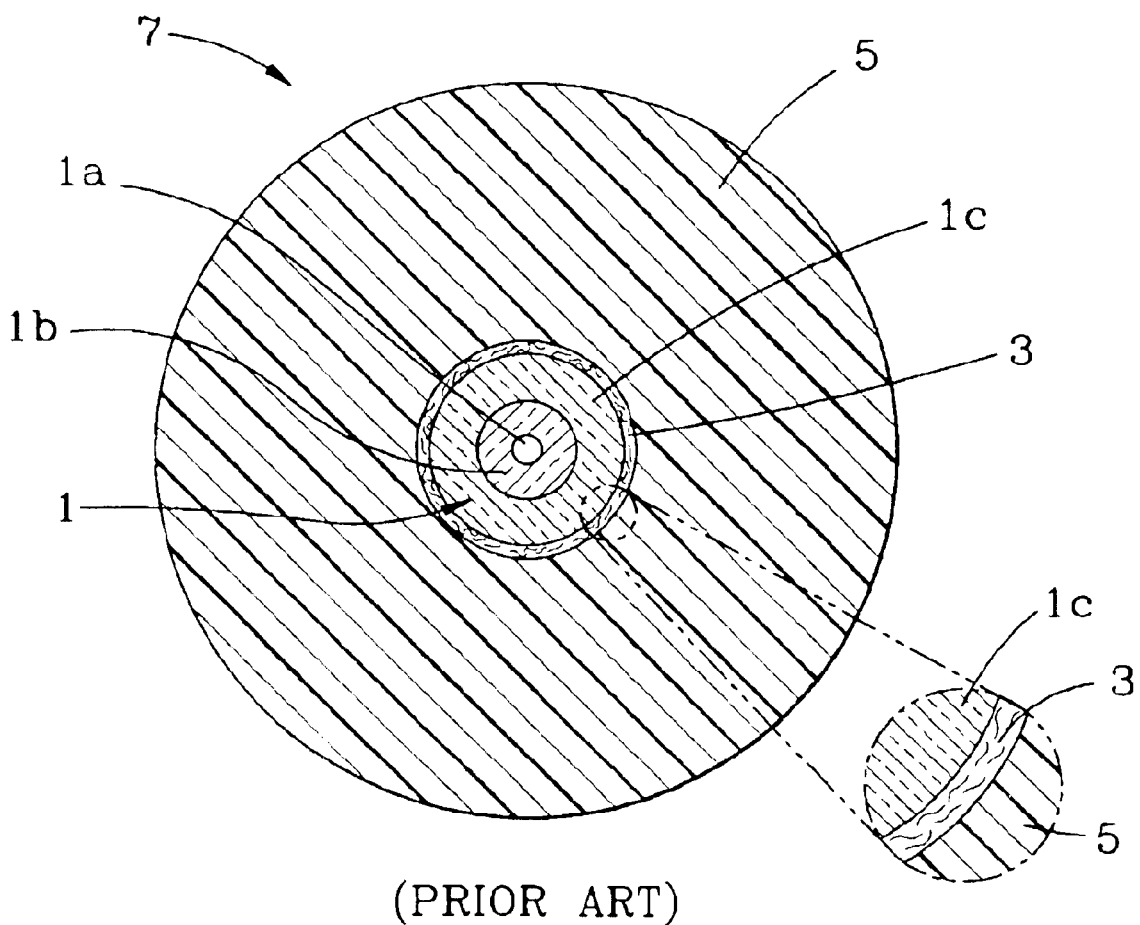
FIG. 1 is a cross-sectional view of a conventional buffered optical waveguide.

FIGS. 2 and 3 depict an optical waveguide cable according to the present invention. More specifically, FIGS. 2 and 3 depict a tight buffered optical fiber 10 that includes an optical waveguide such as an optical fiber 1 having a tight buffer layer 15. However, the concepts of the present invention can be practiced with a loose buffered optical fiber. Tight buffer layer 15 has a predetermined wall thickness t and generally surrounds optical fiber 1, thereby protecting the same. According to one embodiment of the present invention, tight buffer layer 15 has at least one preferential tear portion extending inwardly from an exterior surface 15c of tight buffer layer 15 toward an inner surface, and runs generally longitudinally along axis A—A, thereby forming a preferential tear portion. In this embodiment, two slits 17 are formed about 180 degrees apart, thereby creating preferential tear portions in buffer layer 15. These preferential tear portions advantageously allow the craftsman to initiate a separation of portions 15a,15b, then easily grasp the separated portions 15a,15b of tight buffer layer 15 and propagate the separation of sections 15a,15b by applying a predetermined tearing force. Thus, the craftsman can access optical fiber 1 quickly and easily without damaging the optical fiber. Moreover, tight buffered optical fiber 10 does not require a lubricant as an interfacial release layer in order to remove tight buffer layer 15 in relatively long lengths such as one meter. However, embodiments of the present invention may include a lubricant as an interfacial release layer such as a Teflon®-based or UV curable acrylate layer that acts as a slip layer between buffer layer 15 and optical fiber 1. Additionally, the buffered optical fiber of the present invention generally excludes strength members, but strength members may be used.

Tight buffer layer 15 should not be confused with a buffer tube or a cable jacket. Buffer tubes typically include one or more optical fibers disposed within the buffer tube that float in a water-blocking grease, i.e., a thixotropic gel. Moreover, buffer tubes generally have a relatively large inner diameter when compared to the outer diameter of the optical fibers therein. Furthermore, a water-blocking grease should not be confused with an interfacial release layer. Water-blocking grease is used to inhibit the migration of water within the buffer tube and provide coupling, whereas the interfacial release layer is used for improving stripability of the buffer layer from the optical fiber. Moreover, buffer layers are generally coupled to the optical fiber.

Each optical fiber 1 is a single mode optical fiber having a silica-based core 1a that is operative to transmit light and is surrounded by a silica-based cladding 1b having a lower index of refraction than the core. Additionally, one or more coatings 1c can be applied to optical fiber 1, thereby protecting and/or identifying the same. For example, a soft primary coating surrounds the cladding, and a relatively rigid secondary coating surrounds the primary coating. The coating can also include an identifying means such as ink or other suitable indicia for identification of the optical fiber. However, the coating generally excludes lubricants applied after the manufacture of the optical fiber that are intended to improve the stripability of the tight buffer layer from the optical fiber by conventional stripping methods. In this embodiment, tight buffer layer 15 preferably surrounds, and at least partially contacts, at least one coating 1c of optical fiber 1. Additionally, other suitable optical waveguides can be used such as multi-mode, plastic optical fibers, erbium doped, polarization-maintaining, photonic, specialty, or any other suitable optical waveguide.

FIG. 4 depicts exemplary delta attenuation dB/km of a single mode optical fiber during temperature cycling for the conventional buffered optical waveguide 7 of FIG. 1 and the buffered optical fiber 10 of FIGS. 2 and 3 at a reference wavelength 1550 nm. Specifically, curve 40 represents conventional buffered optical waveguide 7 and curve 42 represents buffered optical fiber 10. As used herein, delta attenuation is, generally speaking, a measurement of optical performance loss due to, for example, stresses and/or strains experienced by the optical cable during environmental changes such as temperature variation from ambient conditions (about 23° C.). The delta attenuation generally excludes insertion losses, inherent attenuation, and other losses, in the optical waveguides, fiber optic connectors and/or splices, which are generally measured at ambient conditions. For example, an optical fiber generally has a certain attenuation loss due to characteristics inherent in the optical fiber, for example, scattering or imperfections in the fiber. Likewise, a fiber optic connector generally has a certain insertion loss due to, for example, misalignment of cores of the mating optical fibers. To determine delta attenuation a baseline insertion loss from the optical waveguide, fiber optic connectors and/or splices is measured at ambient conditions (i.e., room temperature) and subtracted from an insertion loss at a non-ambient condition. Specifically, the temperature cycling of FIG. 4 was performed according to Telcordia GR-409, Issue 1 with a −40° C., 70° C., 23° C. cycle added thereto. As shown, buffered optical fiber 10 of the present invention had surprising results during temperature cycling. Specifically, the delta attenuation of buffered optical fiber 10, at a reference wavelength of 1550 nm, was below about 0.050 dB/km during the entire temperature cycling test. For example, at a temperature of 0° C. the delta attenuation of buffered optical fiber 10 is nearly zero. On the other hand, the conventional buffered optical waveguide had significantly higher delta attenuation as shown. Particularly surprising is that the delta attenuation of buffered optical fiber 10 is below about 0.300 dB/km at −40° C. Specifically, buffered optical fiber 10 had a delta attenuation of about 0.050 dB/km at −40° C. Compare this optical performance with the conventional buffered optical waveguide 7, which had a delta attenuation of nearly 0.600 dB/km at −40° C., thereby making it unsuitable for outdoor applications. Thus, the low temperature optical performance of the present invention makes it advantageously suitable for outdoor or other low temperature applications.

Optical performance and/or preferential tear portion characteristics can be influenced by factors such as geometry and material selection. Slit 17 has a predetermined depth d with respect to the predetermined wall thickness t of tight buffer layer 15, thereby allowing tailoring of the tear force required to separate buffer layer 15 into sections 15a,15b. For example, depth d preferably is between about ten percent to about ninety percent of wall thickness t, more preferably, depth d is between about twenty-five to about seventy-five percent of wall thickness t. However, other embodiments could have one preferential tear portion extending through the entire wall thickness t. Likewise, the width and/or shape of the preferential tear portions can influence tear characteristics. Preferably, slit 17 generally has a v-shape;

however, other suitable shapes such a u-shape can be used as a preferential tear portion. However, the shapes of the preferential tear portions depicted are schematic representations, and the actual shapes viewed under magnification may be somewhat irregular.

The embodiment of the present invention that was temperature cycled had slits 17 having a depth of about 40% of thickness t of the buffer layer. Slits 17 reduce the hoop strength of buffer layer 15 compared with a similarly sized conventional buffer layer 5 because the radius of the hoop of the present invention is reduced by the depth d of slit 17. Moreover, slits 17 aid in "relaxing" buffer layer 15 when being cooled during quenching, thereby reducing the stress and/or strain on optical fiber 1 and generally allowing a more uniform shrinking of buffer layer 15. Stated another way, during quenching the buffer layer cools from the outside surface inward. During cooling the outside surface is "frozen" by contact with the water in the cooling trough and then the buffer layer solidifies from the outer surface inward. Thus, all things being equal, slits 17 provide a greater outer surface area for a smaller material volume per unit length during the cooling process. Additionally, slits 17 allow for shrinkage of buffer layer 15, rather than holding stress and/or strain as in a non-slitted buffer layer with the same thickness t. Furthermore, more uniform shrinking aids in providing relatively uniform coupling between the optical fiber and buffer layer.

Tight buffer layer 15 is preferably constructed from a suitable polymeric material; however, other suitable materials such as radiation curable materials can be used. For example, the tight buffer layer of the present invention that was temperature cycled had an outer diameter of about 900 microns and was formed from a polyvinylchloride (PVC) available from the AlphaGary Corporation of Leominster, Mass. under the tradename of GW 2052 Special. The material of tight buffer layer 15, preferably, has a relatively low elongation to break ratio, for example, a elongation to break ratio using ASTM D-412 of about 500% or less, more preferably, about 400% or less, and most preferably about 300% or less. A relatively low elongation to break ratio allows the material to tear, rather than stretch when a predetermined force is applied to separate sections 15a,15b. However, any suitable material, or outer diameter, can be used with the concepts of the present invention. For instance, tight buffer layer 15 can also include additives for improving flame-retardance, but other suitable additives can be added for other purposes.

Additionally, embodiments of the present invention can have a marking indicia for aiding the craftman in locating the position of the preferential tear portions. For example, section 15a can be extruded as a first color and section 15b can be extruded as a second color during a co-extrusion process, thereby clearly identifying the positions of the preferential tear portions at the color transitions. Moreover, the color combinations are useful for identification of the buffered optical fiber. Alternatively, preferential tear portions can have, for example, a colored stripe formed in, or near, slit 17. However, other methods can be used to locate the preferential tear portion. For instance, a marker rubbed across the buffer layer can locate the preferential tear portion. In other embodiments, pull tabs or filaments are extruded into each portion 15a,15b and extend beyond the surface of the buffer layer, thereby allowing the craftsman to grasp and pull the tabs to tear tight buffer layer 15 (FIG. 5). Furthermore, tight buffered optical fiber 10 can have other suitable components or features such as an interfacial release layer between optical fiber 1 and tight buffer layer 15, a water-swellable component, or any other suitable components or features.

FIG. 5 depicts an optical waveguide cable 50 that employs the concepts of the present invention. Optical waveguide cable 50 includes at least one fiber optic ribbon 51 surrounded by a buffer layer 55 having at least one preferential tear portion such as a slit 57. More specifically, optical waveguide cable includes a ribbon stack 52 with two slits 57 disposed about 180 degrees apart. However, optical waveguides can be disposed in other configurations such as bundles or loose fibers while still employing the concepts of the present invention. Moreover, buffer layers of the present invention can include any suitable number of preferential tear portions at suitable locations.

Additionally, preferential tear portions of the present invention can have other configurations. For instance, FIG. 6 depicts a tight buffered optical fiber 60 employing the concepts of the present invention. Tight buffered optical fiber 60 has an optical fiber 1 and a tight buffer layer 65 having three preferential tear portions arranged generally symmetrically about tight buffer layer 65. In this embodiment, preferential tear portions 67 are disposed intermittently and helically along a longitudinal axis A—A. Moreover, preferential tear portions 67 are depicted with three different shapes to illustrate concepts of the present invention. However, other configurations of preferential tear portions can have intermittent or helical features, rather than both. Likewise, other suitable shapes can be used for the preferential tear portions. Intermittent preferential tear portions allow tearing of a predetermined strip length along the preferential tear portion and inhibit the tear to continue past the preferential tear portion. For instance, if a particular application of the buffered optical fiber requires stripping a 50 cm length of tight buffer layer 65, intermittent slits 67 would be about 50 cm long, thereby advantageously ensuring a proper strip length without measurement. Furthermore, preferential tear portions of the present invention can have other configurations. For instance, the preferential tear portion can have configurations other than radial such as preferential tear portions offset from center, thereby allowing tearing of a side portion of the buffer layer.

FIG. 7 depicts a tight buffered optical fiber 70 employing the concepts of the present invention. Optical waveguide cable 70 includes at least one optical waveguide 1 surrounded by a tight buffer layer 75 having at least one preferential tear portion. In this embodiment, the preferential tear portions are two slits 77, or voids, extending from an inner surface 74 of tight buffer layer 75 radially outward to a predetermined position of tight buffer layer 75. Since locating slits 77 by visual examination can be difficult, this embodiment preferably includes a marking indicia 78 on an exterior surface of buffer layer 75, thereby marking the position of slits 77. Additionally, at least one pull tab 79 or filament can be embedded within tight buffer layer 75 to aid the craftsman in accessing optical waveguide 1.

Figure 10:
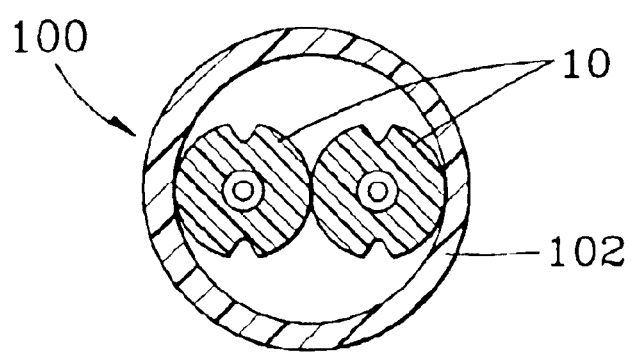
FIG. 10 is a cross-sectional view of another embodiment according to the present invention.

FIG. 8 depicts tight buffered optical fiber 10 forming a portion of optical waveguide cable 80. Optical waveguide cable 80 includes strength members 81 such as aramid or fiberglass and a jacket 82 generally surrounding the same. FIG. 9 depicts another optical waveguide cable 90 in the form of a zipcord. Optical waveguide cable 90 has a first leg 92 and a second leg 94. Legs 92, 94 each form a portion of a common jacket 95. Each leg 92,94 surrounds a tight buffered optical fiber and strength members 91. FIG. 10 depicts another optical waveguide cable 100 according to the present invention. In this embodiment, a plurality of tight buffered optical fibers 10 are disposed within a tube 102. Additionally, optical waveguide cables of the present invention can also be used as a portion of a breakout cable. For example, a plurality of optical waveguide cables 80 can be stranded about a central strength member and have a jacket extruded therearound. Of course, breakout cables can include other components such as binder threads, strength members, or ripcords.

Figure 11:
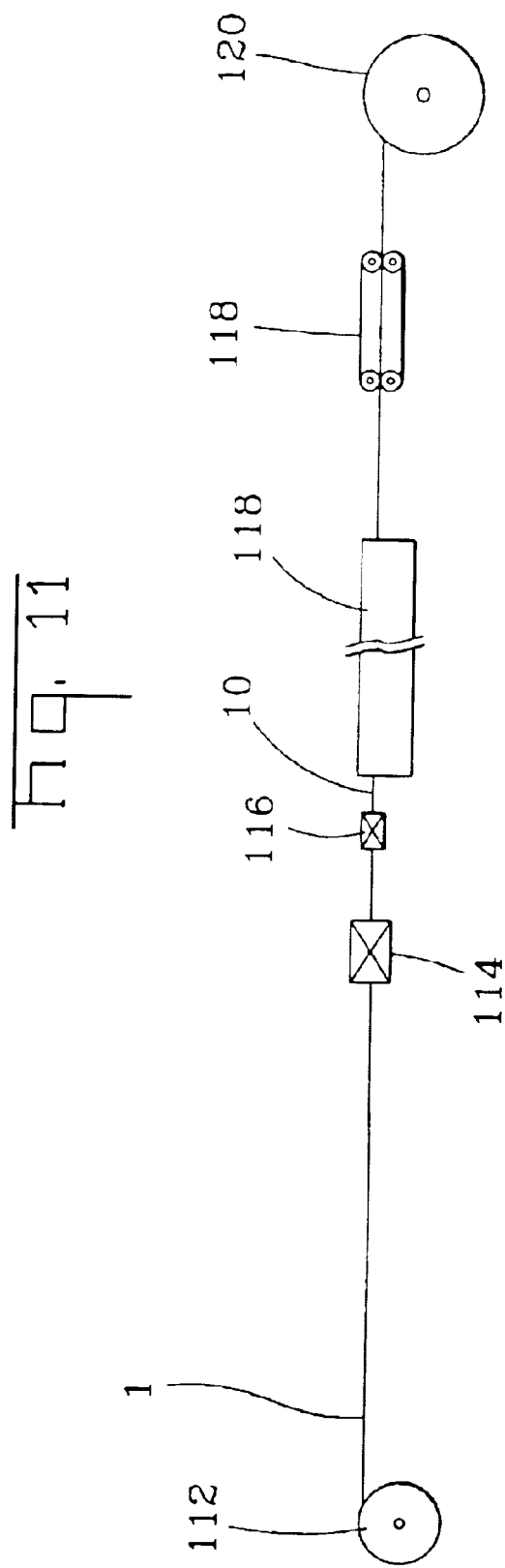
FIG. 11 is a schematic representation of an exemplary manufacturing line for use in the manufacture of embodiments of the present invention.

An exemplary line for manufacturing buffered optical fiber 10 according to the present invention is schematically depicted in FIG. 11. Optical fiber 1 is paid-off from pay-off reel 112 under a suitable tension. If an interfacial release layer is desired it may be applied to optical fiber 1 by coater 114, which may be accomplished on-line as shown or off-line. Buffer layer 15 is then applied by a cross-head extruder 116 having a die suitable for forming preferential tear portions 17 therein, thereby completing buffered optical fiber 10. Water trough 118 cools the relatively hot buffer layer 15 after extrusion. After exiting water trough 50, buffered optical fiber 10 then passes through a pulling device 118 and is wound onto take-up reel 120.

Additionally, other methods are available for manufacturing buffered optical fibers according to the present invention. For instance, the buffer layer can be extruded with a uniform diameter, then the buffer layer contacts a knife-edge that forms preferential tear portions in the buffer layer before quenching. Moreover, the knife-edge can be heated or cold. Another method is to pass the cooled buffered optical fiber through a series of heated dies that incrementally remove material until the desired preferential tear portion is achieved. Still another method of forming the preferential tear portions is by using a laser. However, the preferred methods of manufacture form the preferential tear portion in the buffer layer before the buffer layer is cooled, thereby allowing stress relief of the buffer layer.

Many modifications and other embodiments of the present invention, within the scope of the appended claims, will become apparent to a skilled artisan. For example, the buffered optical fibers of the present invention are suitable for use with other breakout cable, or composite cable, configurations. Additionally, although the concepts of the present invention were described with reference to tight buffer layers, the concepts can be practiced with loose buffered optical fibers. Therefore, it is to be understood that the invention is not to be limited to the specific embodiments disclosed herein and that modifications and other embodiments may be made within the scope of the appended claims. Although specific terms are employed herein, they are used in a generic and descriptive sense only and not for purposes of limitation. The invention has been described with reference to silica-based optical fibers, but the inventive concepts of the present invention are applicable to other suitable optical waveguides, as well as other optical cable configurations.

That which is claimed:

1. A tight buffered optical fiber comprising:
   a single optical fiber; and
   a tight buffer layer, the tight buffer layer having a predetermined wall thickness generally surrounding the single optical fiber and at least one preferential tear portion generally formed along a longitudinal axis of the tight buffer layer for accessing the single optical fiber, wherein the single optical fiber has a delta attenuation of about 0.300 dB/km or less at a temperature of about −40° C. at a reference wavelength of about 1550 nm.

2. The tight buffered optical fiber of claim 1, the single optical fiber having a delta attenuation of about 0.050 dB/km or less at a temperature of about −40° C. at a reference wavelength of about 1550 nm.

3. The tight buffered optical fiber of claim 1, the tight buffer layer being formed from a material having an elongation to break ratio of about 500% or less.

4. The tight buffered optical fiber of claim 1, the tight buffer layer being formed from a material having an elongation to break ratio of about 300% or less.

5. The tight buffered optical fiber of claim 1, the at least one preferential tear portion having a predetermined depth, the predetermined depth being between about ten percent to about ninety percent of the predetermined wall thickness.

6. The tight buffered optical fiber of claim 1, the tight buffer layer having two preferential tear portions, the two preferential tear portions being located about 180 degrees apart.

7. The tight buffered optical fiber of claim 1, the at least one preferential tear portion being formed intermittently along the longitudinal axis.

8. The tight buffered optical fiber of claim 1, further including a marking indicia for locating the preferential tear portion.

9. The tight buffered optical fiber of claim 1, the tight buffer layer being formed from two different colored materials.

10. The tight buffered optical fiber of claim 1, the at least one preferential tear portion having a predetermined depth, the predetermined depth being between about twenty-five percent and about seventy-five percent of the predetermined wall thickness.

11. The tight buffered optical fiber of claim 1, the single optical fiber having an interfacial release layer thereon.

12. The tight buffered optical fiber of claim 1, the preferential tear portion extending toward an internal surface of the tight buffer layer.

13. The tight buffered optical fiber of claim 1, the preferential tear portion extending toward an external surface of the tight buffer layer.

14. The tight buffered optical fiber of claim 1, the tight buffer layer having a plurality of preferential tear portions, the plurality of preferential tear portions being spaced apart at intervals of about 180 degrees or less.

15. The tight buffered optical fiber of claim 1, the tight buffered optical fiber being a portion of an optical waveguide cable.

16. The tight buffered optical fiber of claim 1, the tight buffered optical fiber being a portion of a zipcord.

17. The tight buffered optical fiber of claim 1, the preferential tear portion being a slit.

18. The tight buffered optical fiber of claim 1, the single optical fiber being selected from the group of a single-mode optical fiber and a multi-mode optical fiber.

19. The tight buffered optical fiber of claim 1, the buffer layer having an outer diameter of about 900 microns or less.

20. An optical waveguide cable comprising:
    at least one optical waveguide; and
    a buffer layer, the buffer layer surrounds the at least one optical waveguide and includes at least one preferential tear portion, wherein the buffer layer is formed from a material having an elongation to break ratio of about 500% or less so that the at least one preferential tear portion of the buffer layer is capable of being torn when a predetermined tearing force is applied.

21. The optical waveguide cable of claim 20, the at least one optical waveguide having a delta attenuation of about 0.300 dB/km or less at a temperature of about −40° C. at a reference wavelength of about 1550 nm.

22. The optical waveguide cable of claim 20, the at least one optical waveguide having a delta attenuation of about 0.050 dB/km or less at a temperature of about −40° C. at a reference wavelength of about 1550 nm.

23. The optical waveguide cable of claim 20, the at least one optical waveguide being a portion of an optical fiber ribbon.

24. The optical waveguide cable of claim 20, the buffer layer being formed from a material having an elongation to break ratio of about 300% or less.

25. The optical waveguide cable of claim 20, the at least one preferential tear portion having a predetermined depth, the predetermined depth being between about ten percent to about ninety percent of a predetermined wall thickness of the buffer layer.

26. The optical waveguide cable of claim 20, the buffer layer having two preferential tear portions, the preferential tear portions being located about 180 degrees apart.

27. The optical waveguide cable of claim 20, the at least one preferential tear portion being formed intermittently along the longitudinal axis.

28. The optical waveguide cable of claim 20, further including a marking indicia for locating the preferential tear portion.

29. The optical waveguide cable of claim 20, the buffer layer being formed from two different colored materials.

30. The optical waveguide cable of claim 20, the at least one preferential tear portion having a predetermined depth, the predetermined depth being between about twenty-five percent to about seventy-five percent of a predetermined wall thickness of the buffer layer.

31. The optical waveguide cable of claim 20, the at least one optical waveguide having an interfacial release layer thereon.

32. The optical waveguide cable of claim 20, the preferential tear portion extending toward an internal surface of the buffer layer.

33. The optical waveguide cable of claim 20, the preferential tear portion extending toward an external surface of the buffer layer.

34. The optical waveguide cable of claim 20, the at least one optical waveguide being selected from the group of a single-mode optical fiber and a multi-mode optical fiber.

35. The optical waveguide cable of claim 20, the buffer layer having an outer diameter of about 900 microns or less.

36. A tight buffered optical fiber consisting of:
   an optical fiber, the optical fiber having a core, a cladding, and at least one coating; and
   a tight buffer layer, the tight buffer layer having at least one preferential tear portion generally formed along a longitudinal axis of the tight buffer layer, wherein the tight buffer layer is in at least partial contact with the at least one coating, and the tight buffer layer being formed from a material having an elongation to break ratio of about 300% or less so that the at least one preferential tear portion of the buffer layer is capable of being torn when a predetermined tearing force is applied, thereby allowing access to the optical fiber.

37. An optical waveguide cable comprising:
   at least one optical waveguide; and
   a buffer layer, the buffer layer generally surrounding the at least one optical waveguide and having at least one preferential tear portion generally formed along a longitudinal axis of the buffer layer, wherein the at least one optical waveguide has a delta attenuation of about 0.300 dB/km or less at a temperature of about −40° C. at a reference wavelength of about 1550 nm.

38. The optical waveguide cable of claim 37, the at least one optical waveguide having a delta attenuation of about 0.050 dB/km or less at a temperature of about −40° C. at a reference wavelength of about 1550 nm.

39. The optical waveguide cable of claim 37, the at least one optical waveguide being a portion of an optical fiber ribbon.

40. The optical waveguide cable of claim 37, the buffer layer being formed from a material having an elongation to break ratio of about 500% or less.

41. The optical waveguide cable of claim 37, the at least one preferential tear portion having a predetermined depth, the predetermined depth being between about ten percent to about ninety percent of a predetermined wall thickness of the buffer layer.

42. The optical waveguide cable of claim 37, the buffer layer having two preferential tear portions, the preferential tear portions being located about 180 degrees apart.

43. The optical waveguide cable of claim 37, the at least one preferential tear portion being formed intermittently along the longitudinal axis.

44. The optical waveguide cable of claim 37, further including a marking indicia for locating the preferential tear portion.

45. The optical waveguide cable of claim 37, the buffer layer being formed from two different colored materials.

46. The optical waveguide cable of claim 37, the at least one preferential tear portion having a predetermined depth, the predetermined depth being between about twenty-five percent to about seventy-five percent of a predetermined wall thickness of the buffer layer.

47. The optical waveguide cable of claim 37, the at least one optical waveguide having an interfacial release layer thereon.

48. The optical waveguide cable of claim 37, the preferential tear portion extending toward an internal surface of the buffer layer.

49. The optical waveguide cable of claim 37, the preferential tear portion extending toward an external surface of the buffer layer.

50. The optical waveguide cable of claim 37, the at least one waveguide being selected from the group of a single-mode optical fiber and a multi-mode optical fiber.

51. The optical waveguide cable of claim 37, the buffer layer having an outer diameter of about 900 microns or less.

52. A method for manufacturing a buffered optical fiber, the method comprising the steps of:
   paying off a single optical waveguide;
   extruding a buffer layer around the single optical fiber, the buffer layer having an outer diameter of about 900 microns or less, wherein the buffer layer is formed from a material having an elongation to break ratio of about 500% or less; and
   forming at least one preferential tear portion in the buffer layer for accessing the single optical waveguide.

53. The method of claim 52, the at least one preferential tear portion being formed by extruding the buffer layer.

54. The method of claim 52, the at least one preferential tear portion being formed after extruding the buffer layer.

55. The method of claim 52, the buffered optical fiber being a tight buffered optical fiber.

56. The method of claim 52, wherein the optical waveguide has a delta attenuation of about 0.300 dB/km or less at a temperature of about −40° C. at a reference wavelength of about 1550 nm.

57. The method of claim 52, wherein the optical waveguide has a delta attenuation of about 0.050 dB/km or less at a temperature of about −40° C. at a reference wavelength of about 1550 nm.

58. The method of claim 52, the buffer layer being formed from a material having an elongation to break ratio of about 300% or less.

59. The method of claim 52, the at least one preferential tear portion having a predetermined depth, the predetermined depth being between about ten percent to about ninety percent of a predetermined wall thickness of the buffer layer.

60. The method of claim 52, the buffer layer having two preferential tear portions, the two preferential tear portions being located about 180 degrees apart.

61. The method of claim 52, further comprising the step of forming an interfacial release layer on the single optical waveguide.

62. The method of claim 52, the optical waveguide being selected from the group of a single-mode optical fiber and a multi-mode optical fiber.

* * * * *